United States Patent Office 2,725,259
Patented Nov. 29, 1955

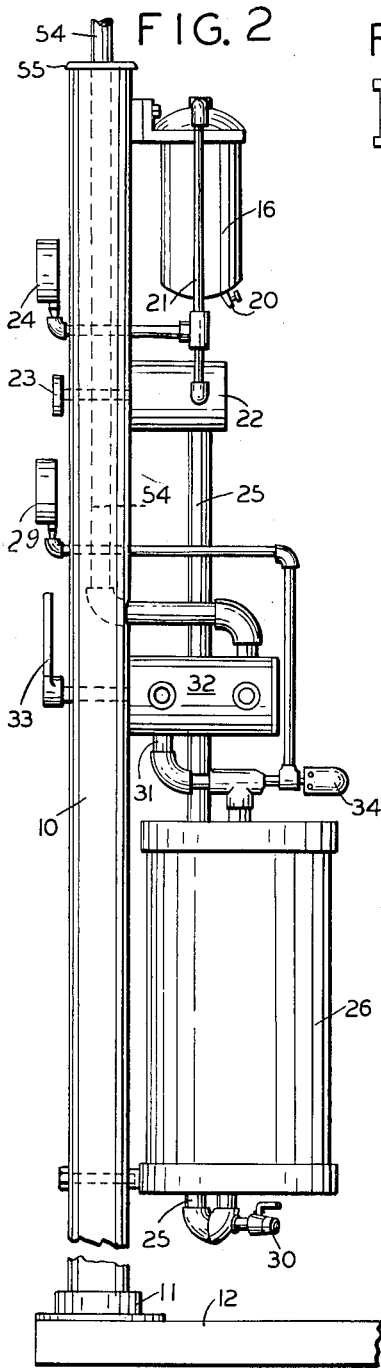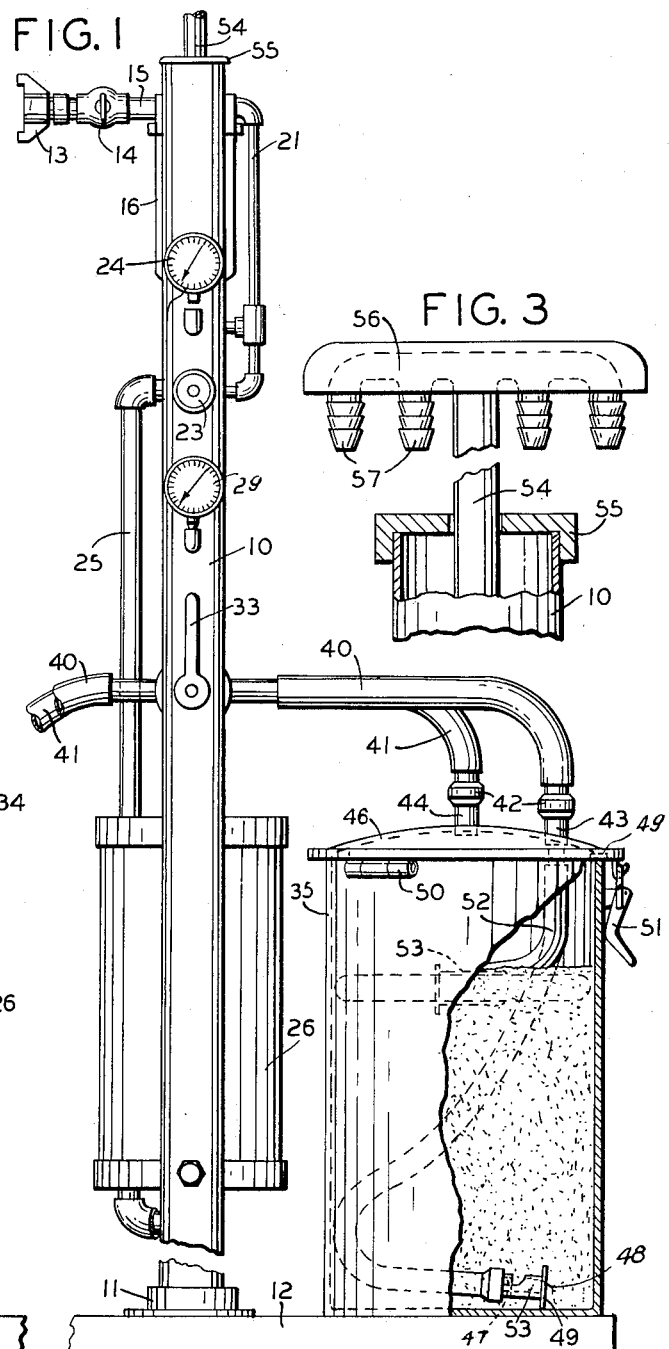

2,725,259

DRY SPRAY APPARATUS

Frank T. Ward, Wilton, Conn.

Application July 14, 1954, Serial No. 443,321

2 Claims. (Cl. 302—53)

This invention relates to an improved arrangement for depositing finely divided materials uniformly over surfaces and relates more particularly to a novel unit for incorporating powdered material in the air in an air line so that the powdered material will be easily and uniformly fed into the line and dispersed throughout the air which simultaneously acts as a carrier to deliver the dispersed powder to powder application stations or dusting hoods.

The method and apparatus of the present invention has particular application to the baking industry wherein it has long been known that extremely fine starch is far superior to flour as a dusting agent. Much less starch than flour is required for this purpose and this method applies the starch dust in controlled minimum amounts needed and direction, thereby avoiding the excessive waste of flour and contamination of bakery plant air that now occurs.

An important object of the invention is to provide an improved apparatus of this character wherein the air is fully conditioned as to dryness, freedom from foreign matter and as to pressure, before the air is introduced to the powder and air mixing chamber.

Another object of the invention is to provide novel means whereby handling of the powdered material consumed is reduced to a minimum, primarily in that it is not necessary even to remove it from the container in which it was shipped by its maker. In other words, it leaves its shipping container for the first time when it is incorporated into the stream of air which delivers it to the place of application. This feature eliminates the need for a starch hopper separate from the mixing chamber as appears to have been required in other devices of this character, which other devices also appear to have required a particularly complex combination of equipment for performing an exceedingly simple function.

Another object of the invention is to provide an apparatus which can operate with a floor level starch tank, rather than a high level starch hopper which must be used in other devices depending fully or partially on gravity to feed the dusting material into the mixing chamber and dusting line. Such high level hoppers are difficult and dangerous to load and re-load, and usually must be filled by repeated trips up steps or a ladder with a number of small pails of the dusting powder resulting, in turn, in considerable contamination of the plant atmosphere when the pails are filled on the floor and then dumped into the hopper. The floor-level tank of the present invention is designed for convenient floor level charging with factory filled standard containers of the dusting powder that need to be opened only after their easy insertion into the tanks, thereby eliminating both the abnormal lifting and the dust problems.

Another important object of the invention is to insure exact uniformity of dispersion and quantity flow of the powder without pulsating air flow and with continuous operation even during the period when the charge in one tank is becoming exhausted and another full tank needs to be cut in for consumption.

A further object of the invention is to provide novel alarm means for indicating to the operator when the charge in one tank is about to become exhausted and another full tank must be made available.

Yet another object of the invention is to provide an apparatus of this character having a novel mixing chamber which also holds the charge of powdered material and which uniformly distributes the powdered material in the air stream and wherein a greater or lesser concentration of the powder is obtained by operating a single control knob, convenient to the operator, which gives very fine graduations of powder concentration by simply varying the pressure of the air stream.

Another object of the invention is to provide a dry spray apparatus wherein it is virtually impossible to cause clogging of the system, since the sprayed material is not required to pass through any reduced or choked orifices, and wherein the system may be readily cleaned at the close of an operation.

The embodiment of the invention shown in the drawings is adapted especially for applying starch to dough in baking but it may also be used to great advantage in the manufacture of other food and confectionery items, in the graphic and printing arts, in the rubber industry, and in all instances wherein finely divided powder needs to be applied evenly and easily to a surface.

In th drawing:

Fig. 1 is a broken front elevation of the unit of the present invention.

Fig. 2 is a broken side elevation thereof.

Fig. 3 is a broken enlarged view of the upper end of the mast and showing the hose couplings.

In a bakery installation the operating parts of the unit of the present invention are supported by a tubular mast 10 which may be an aluminum, stainless steel, wrought iron pipe, or other metal tube, and the mast is rigidly mounted in a socket 11 carried by a flat base 12. Air is supplied to the unit through a pipe extending from the existing bakery compressed air system which is usually at a pressure of 90–100 lbs. per sq. in. A coupling 13 connects the unit with the air system.

A main shut-off cock 14 controls the supply of air to the unit and a pipe 15 from the cock feeds the air into a combined strainer and filter 16 which serves to remove dirt, oil and free water from the air. A drain cock 20 is located at the lower end of the filter housing. From the filter housing a pipe 21 feeds the air through a pressure regulating valve 22 which serves to reduce the pressure from the supply to a maximum of about 30 lbs. A knob 23 on the valve stem permits very fine regulation of the air pressure between 0 lb. and a maximum of 30 lbs. A gauge 24 is connected with pipe 21 by which the operator can know that he is getting shop air at the pressure normally maintained in the shop line.

From the pressure regulating valve the air, at whatever pressure up to 30 lbs. the operator may choose, is fed through pipe 25 to the lower end of an air dehydrating unit 26 which serves to dry the air further. This may be a conventional silica gel unit which will dry the air sufficiently to obviate any clogging or sticking of the starch during its passage to the starch dusting hood. A drain cock 30 is located at the lower end of this unit.

From the dehydrating unit 26 the dried air is fed through pipe 31 to a valve assembly 32 having two three-way cocks which are controlled by a single handle 33. A gauge 29 is connected with pipe 31 by which the operator can set the exact reduced pressure required in the starch line for the particular dough being dusted. A safety valve 34 is connected with pipe 31 to insure a reduced air pressure not to exceed 30 lbs. For other than bakery applications this maximum pressure may, of course, be different.

Valve assembly 32 includes two three-way cocks which are mounted tandem on one shaft or otherwise interconnected so that single handle 33 operates both simultaneously. These cocks are not illustrated in detail since their structure is well known. The need for these cocks arises from the desirability of being able to change over from an almost empty tank of starch to a full tank without having to shut down any dough handling machinery.

The right-hand one of these two tanks is shown at 35 in Fig. 1. The left-hand tank is not shown. But all connections, fittings and equipment described for the right-hand tank are duplicated for the left-hand tank. The valve handle 33 has three positions, i. e., to left tank (not shown), to both tanks and to right tank. Thus when the handle is being moved by the operator to disconnect a nearly empty starch tank and cut in a full tank the air will go both to the nearly empty and to the full tank while the handle is in center position. The object of this arrangement is to allow pressure to build up and starch dispersion to develop in the full tank before finally cutting out the nearly empty tank. This provides for full starch dust delivery to the dusting hoods at all times and definitely avoids even a momentary sag in starch flow during the changeover from a nearly empty to a full tank.

Air under controlled pressure is fed through the first of the tandem cocks in valve assembly 32 to either of the tanks 35 by means of opaque flexible hoses 40 and the air and dispersed starch is forced from the tanks through transparent flexible hoses 41. Hoses 40 and 41 are provided with quick-attach fittings 42 for connection to inlet and outlet pipes 43 and 44 passing through the cover 46 which is hinged at 50 to the tank. The hinged cover 46 is secured in closed position by a number of toggle clamps 51, and an air-tight seal is maintained between cover 46 and tank 35 by means of circular gasket 49.

Outlet pipe 44, which is located in the center of the cover, terminates just inside the cover, and the inlet pipe 43, located nearer the edge of the cover, extends down further into the tank to provide a nipple over which is attached a suitable length of soft rubber tubing 52. The inside of the tank is of such size as to form a properly proportioned upper chamber, where mixing and dispersion of the starch in the air occurs, and a lower chamber to receive a standard factory packed container of starch. The starch used is shipped in easily handled 50-lb. containers. If the tank has a capacity of 65 lbs. there is sufficient space above the starch in a fully charged tank for its proper dispersion into the air before the air and starch mixture leaves the tank.

Tubing 52 is coiled in a plane parallel to the surface of the starch in tank 35 and in the full tank it rests in the form of a flat spiral on top of the starch with the free end of the tube against the side of the tank. The free end of the tube fits onto a warning whistle 53 which also rests on the starch until air flow begins whereupon it almost submerges itself in the starch. The whistle has a restricted entrant channel 47 and an open end 48.

During operation air flowing under pressure through tube 52 and escaping into tank through whistle 53 produces a reaction force in curved tube 52 that always keeps the free end of tube 52 and the whistle 53 against the side of the tank 35, which in turn assures that the emerging air will swirl around the circular interior of the tank with a turbulent spiral motion that rapidly and uniformly creates and maintains the necessary dispersed starch dust cloud.

When the air flowing through the tube and whistle has agitated the starch and a cloud of starch has formed in the open space above the starch, the starch laden air is forced out through outlet pipe 44 in the center of cover 46 through transparent hose 41 back to the second of the tandem cocks in valve assembly 32 and thence flows upwardly through a pipe 54 located centrally of the mast. The pipe passes through an end cap 55 and is connected at its top end with a manifold 56 carrying quick-attach hose nipples 57 to which delivery hoses may be attached whose other ends terminate in suitable nozzles in dusting hoods, briefly described in the following paragraph.

In bakeries the apparatus for applying the starch onto the passing dough will consist of a starch dust delivery nozzle in a suitably formed enclosure or dusting hood. The dust laden air stream blows over the units of dough and this starch cloud coats them and the dough conveyor belt as they pass, making and keeping them non-sticky. Nozzles of requisite shape are provided in these dusting hoods to control both the direction, turbulence and quantity of starch distributed. These dusting hoods, of which there may be many shapes and sizes, are suitably connected to a suction type dust collector system so that any starch that does not adhere to the dough is not only prevented from getting into the plant atmosphere but is carried to a standard central hopper with suitable baffle-type air filters where it is recovered for re-use. Because of the positive and sensitive control of starch dust volume delivered to the dusting hoods by this invention no excess of starch dust over the exact amount required is delivered and the amount of starch to be recovered by the dust collector is a minimum.

In actual bakery operation considerably less than 30 lbs. will deliver all the starch which is required. For instance, for a single dusting hood from 2 to 5 lbs. may be adequate and only in rare instances when four or more dusting hoods are attached to manifold 56 will the pressure valve be set to deliver as much as or more than 15 lbs. During operation rubber tube 52 is always supported on the starch and barely sinks into it at its free end. While the air is escaping there is always a constant amount of starch dust diffused into the air above the starch for any given air pressure and consequent volume of air for a unit of time. This regulation remains constant as long as there is starch in the tank to support the tube. The tube will not and does not sink or dig itself far down into the starch but, on the contrary, floats on the starch only partially submerged and remains in this position from full tank to empty tank. It is essential for proper dusting action that for any setting of the air pressure the amount of starch delivered per minute to the spray hoods should remain constant and uniform. The present apparatus accomplishes this simply and accurately without having to resort to any complicated arrangement or supplementary controls and without the disadvantages inherent in systems which must rely on air pulses and consequent periods of interrupted flow and starch starvation.

Regarding the whistle 53, it is to be noted that this is constructed with an open end 48. As long as the whistle remains partially buried in the starch dust, as is the case until the tank is almost empty, the open end tube of the whistle contains starch and therefore emits no audible sound despite the air passing out of its orifices. The disc 49 surrounding the open end of the whistle tube serves an important function. When the starch gets sufficiently low in tank 35 this disc comes to rest on the bottom of the starch tank and prevents the open end of the whistle from dropping further within the still receding starch. The air pressure then clears the starch out of the open end of the whistle tube and the whistle starts to emit a shrill alarm. Thus, as soon as the first starch tank becomes nearly empty the operator is alerted by the whistle to change over to the full tank of starch. He first moves the valve handle 33 to center position so that the starch from the nearly empty tank will continue to feed the dusting hoods until the full tank is pressurized and starch dust is flowing from it to the same dusting hoods. This will occur almost instantly and as soon as starch dust flow is visible to the operator in the transparent hose 41 from the full tank, he can move the valve handle all the way to the full tank side, thereby cutting out the nearly empty tank.

Later, when occasion permits, the operator opens the hinged cover of the nearly empty tank, lifts the free end of the rubber tube outside the tank, removes the nearly empty container and inserts a full factory packed container of 50 lbs. of starch; properly replaces the rubber tube and closes and seals the tank cover with the toggle clamps. When the dough production line served by the duster is shut down the operator, by simply disconnecting the hoses from one of the starch tanks, coupling the free ends of the hoses together, and opening the pressure regulating valve as required, can thoroughly blow out all of the piping and lines to their very ends in the dusting hoods. He can also blow out practically all of the starch dust that may remain in an empty tank by leaving it normally connected and by ignoring the whistle until the tank has been cleared. In either operation the dust blown through to the dusting hoods will be recovered for re-use by keeping the dust collector system in operation during the blowing out period.

What I claim is:

1. A tank for use in a compressed air system for spraying powder, said tank having a lower section which receives a charge of the powder, an upper section forming a mixing chamber, and a cover for securely closing the tank and having inlet and outlet nipples, a flexible tube secured to the inlet nipple and being of sufficient length to enable a short section to lie horizontally on the bottom of the tank when the latter is substantially empty, and an air-actuated audible whistle secured at the outer end of the tube to emit a warning sound when the tank is empty, said whistle having an open end and being arranged to lie partially submerged in the mass of powder and to move downwardly as the powder passes out of the tank, the whistle being provided with a flange which spaces the whistle from the bottom of the tank.

2. An apparatus for spraying powder comprising a tank having a lower section to receive a container of the powder in its initial package and an upper section forming a mixing chamber, a removable cover for the tank and having inlet and outlet openings and nipples secured in the openings, a flexible tube secured to the inlet nipple and provided at its opposite end with an air-actuated audible whistle, the tube being of sufficient length to form a coil on the upper surface of the powder when the container is full and to extend to the lower wall of the container when it is substantially empty and provide at least a short section extending horizontally on said lower wall, the whistle having an open end and being provided with an annular flange which spaces the whistle from the lower wall of the container when the latter is substantially empty, a conduit leading from a source of compressed air to the inlet nipple, a filter, a strainer and a pressure regulating and reducing valve in the line of flow of the air, and a conduit connected with the outlet nipple for delivering air with the powder incorporated therein.

References Cited in the file of this patent

UNITED STATES PATENTS

| | | |
|---|---|---|
| 1,349,751 | Cross | Aug. 17, 1920 |
| 2,501,047 | Gustafsson | Mar. 21, 1950 |
| 2,530,689 | Egger | Nov. 21, 1950 |
| 2,577,519 | Gustafsson | Dec. 4, 1951 |